Patented July 14, 1942

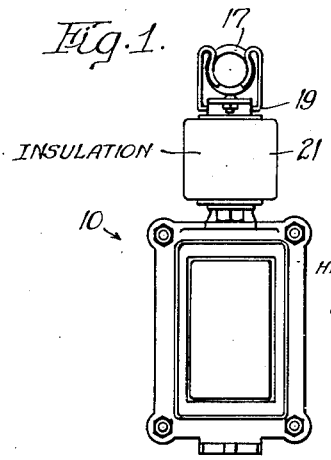
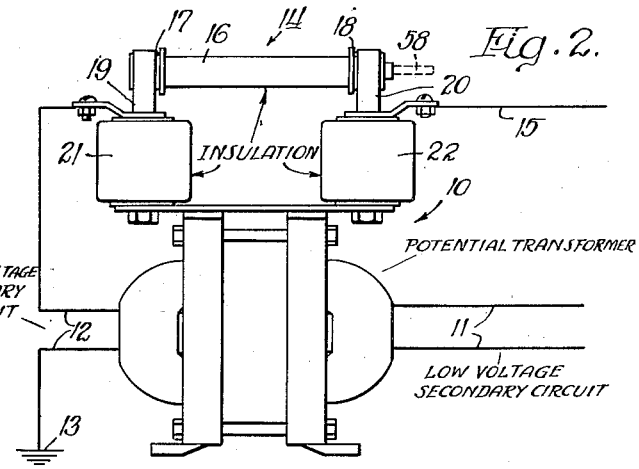
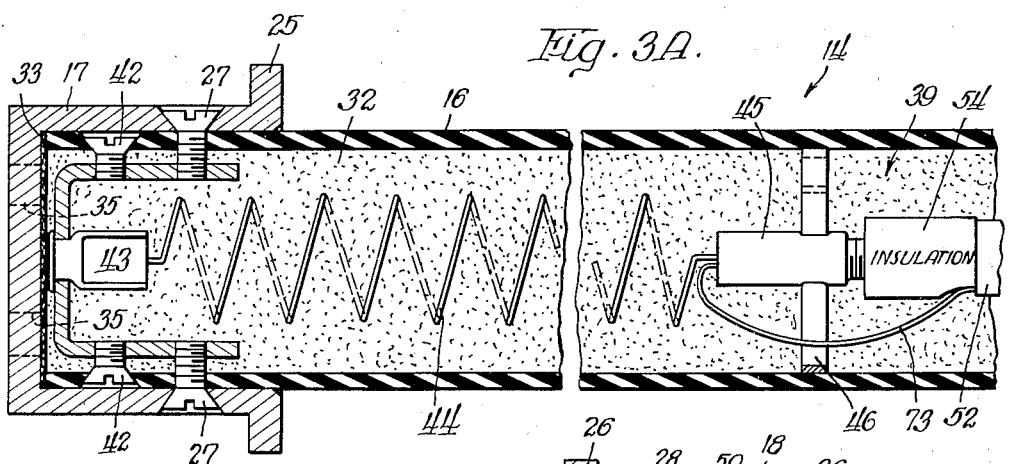
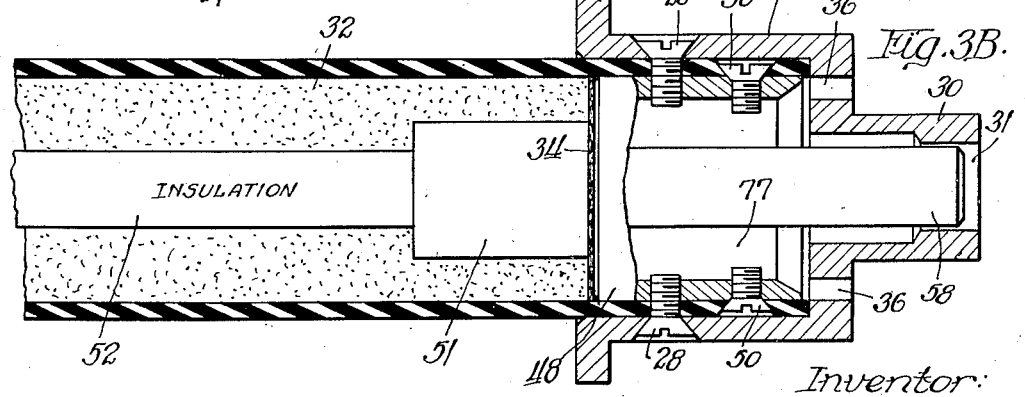

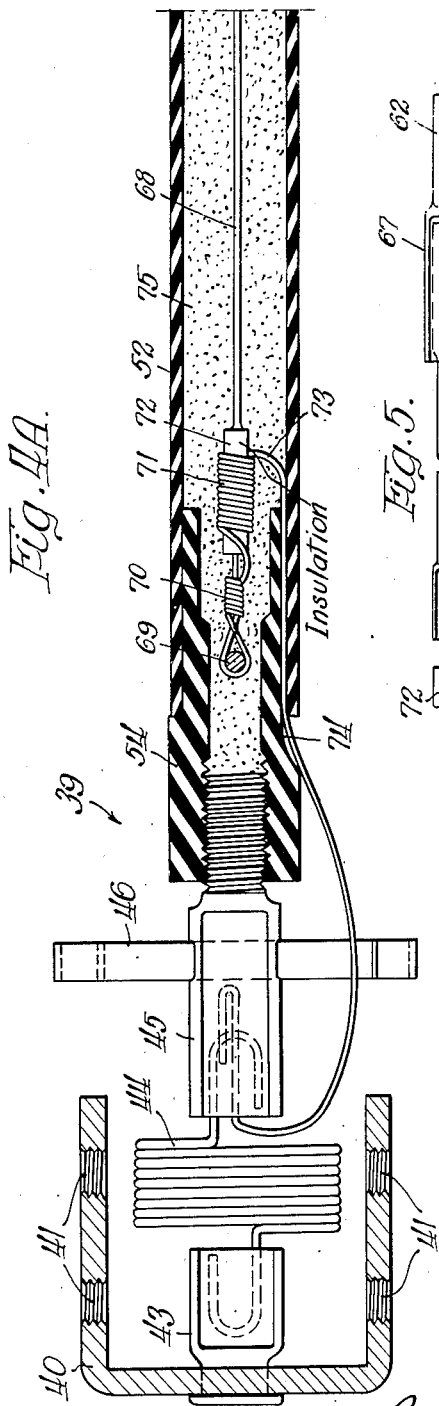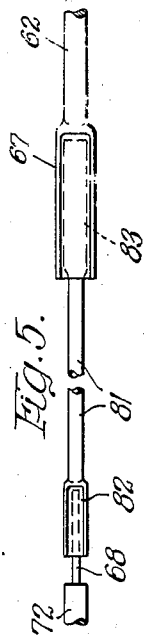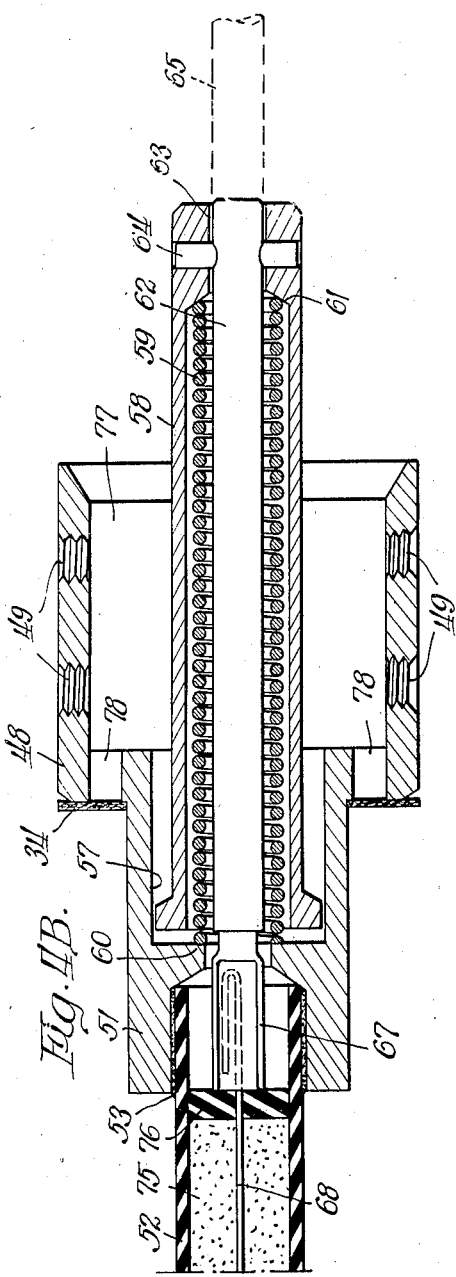

2,290,105

UNITED STATES PATENT OFFICE 2,290,105

FUSE CONSTRUCTION

Sigurd I. Lindell, Chicago, Ill., assignor to Schweitzer & Conrad, Inc., Chicago, Ill., a corporation of Delaware Application July 21, 1939, Serial No. 285,661

8 Claims. (Cl. 200—117)

This invention relates, generally, to electric circuit interrupters and it has particular relation to fuse devices.

There are certain installations of high voltage electrical apparatus in which the current normally flowing is relatively small and in which the fault current that is likely to occur with certain types of faults is also relatively small. A condition of this kind is exemplified by a potential transformer, the primary winding of which is connected across a relatively high voltage electric power circuit, for example across a 2300 volt circuit, while the secondary winding is connected to the potential windings of indicating, integrating and recording instruments. The current flow through the primary winding of such a transformer under normal operating conditions is of the order of 100 milliamperes or less. Now, assuming that a fault occurs in the secondary circuit of the transformer, and for illustrative purposes, assuming that the secondary winding is completely short-circuited, still only a relatively small fault current flows through the primary winding of the transformer. Actual tests on a commercial type of potential transformer having a primary winding adapted for connection to a 2300 volt circuit and a secondary winding adapted to be connected to a 115 volt metering circuit and of 200 volt ampere capacity showed that when the secondary winding was completely short-circuited, the current flowing in the primary winding was 3.15 amperes. At the expiration of five seconds, this current flow was reduced to 2.82 amperes, while at the end of ten seconds it was reduced to 2.60 amperes. In view of these data, it is apparent that a fuse device for protecting a potential transformer of this type on the occurrence of a fault in the secondary circuit must be capable of interrupting a relatively low excess or fault current of the order of from 2 to 3 amperes.

If it were always certain that a fault would occur on the secondary circuit, it would be a simple matter to devise a fuse that would be capable of interrupting the flow of fault current of such magnitude. Such is not the case, however, since it is possible that a fault will occur in the primary winding or that the primary winding may become short-circuited. Since many potential transformers are connected to electric power busses in which the impedance between the point of connection and the source of power is relatively small, or where upon the occurrence of a short circuit, the current flow is likely to be of the order of thousands of amperes, the fuse device to be satisfactory must also be capable of interrupting the current flow to the transformer under these exacting conditions.

Thus, a fuse to be satisfactory for the foregoing purposes must be capable of interrupting not only relatively low excess or fault currents of the order of a few amperes but also it must be capable of interrupting current flow under conditions where the ultimate fault current may be of the order of several thousands of amperes.

A fuse device that is capable of providing satisfactory operation under the foregoing conditions is illustrated and described in Patent 2,084,495 to Lindell. The fuse shown in this patent comprises a glass sleeve to the ends of which terminals are sealed and which is filled with an insulating liquid. The fusible element comprises a length of relatively high strength wire that is connected at one end to one of the external terminals while the other end is connected through a mechanical advantage device to a movable terminal within the sleeve. A coil tension spring is provided for retracting the movable terminal when the fuse wire parts. In order to permit the use of a relatively high strength fusible element and still provide the desired time-current operating characteristics, a coil of wire is provided around a portion of the fusible element and is connected in series circuit relation therewith. The coil may comprise turns of wire forming a continuation of the fusible element itself. Under certain predetermined overload conditions, the heat generated by the current flowing through the coil together with the heat generated because of the current flowing through the wire itself is sufficient to melt or fuse the latter although the current flowing through it alone would be insufficient to cause this. The resulting arc that is drawn on parting of the fusible element at this particular portion is quickly extinguished by directing the flow of the arc extinguishing liquid into it. Such a liquid fuse does not have incorporated therein a current limiting characteristic. This is often provided by an external resistor which, of course, takes up space. In some installations the available space does not permit the use of the combination of a liquid fuse and an external resistor. In such case it is desirable to incorporate the current limiting characteristic in the fuse itself.

In the copending application of Triplett, Serial No. 85,015, filed June 13, 1936, and assigned to the assignee of this application, now Patent No. 2,200,608, is shown a fuse construction in which is incorporated a current limiting characteristic and which is capable of giving satisfactory operation under a wide range of fault currents. In general, the fuse device shown in this application comprises a fusible element that is arranged to melt or blow either on the occurrence of relatively low excess or fault current or on the occurrence of a relatively great fault current. In series circuit relation with this fusible element is connected a refractory metallic conductor, embedded in a mass of powder, the resistance of which is automatically increased until it becomes substantially a non-conductor when it is heated on flow of predetermined current therethrough. The fusible element and variable resistance element, in effect, comprise a conductor which interconnects the external terminals at the ends of the fuse tube or housing that is filled with the powder. The fusible element comprises a silver wire in parallel with a strain wire of high tensile strength, such as a nickel-chromium wire. The variable resistance element comprises a coil of tungsten or molybdenum wire while the mass of powdered material within the housing comprises limestone or marble dust. In a modification of the fuse device disclosed in said copending application, there is provided an indicator that moves longitudinally of one of the external terminals. A spring is provided for biasing the indicator outwardly and the indicator itself is restrained from such movement by the high strength strain wire which parallels the silver wire of the fusible element. Of course, the purpose of the silver wire as a part of the fusible element materially increases its current carrying capacity and likewise increases the fault current required to melt it.

Tests were made on the ability of a wire of the nature of a strain wire alone to interrupt relatively small fault currents. Using a wire, purchased on the market under the trade name of Chromel (A), having a diameter of 0.0113", it was found that a two-ampere arc drawn within a filling of marble dust did not extinguish itself within five seconds. There was not sufficient energy in the arc to melt away the ends of the strain wire sufficiently to lengthen the arc to an extent where the line voltage of 2300 volts would be incapable of sustaining it.

Then a tension was applied to a wire of this nature and current was caused to flow through it. It was found that the wire would elongate a substantial distance on flow of 2 to 3 amperes of current. This indicated that the mere omission of the silver wire in parallel with the strain wire in the fuse constructions shown in said Triplett application would probably not provide the desired low fault current interrupting characteristic. Without a spring the arc which would be formed would not fuse away the ends of the strain wire sufficiently fast to provide satisfactory circuit interruption and with a spring there would be a tendency for the strain wire to elongate and permit movement of the indicator to the operated position without actually interrupting the circuit.

An object of the invention is to permit satisfactory low excess or fault current operation of a fuse while still retaining its ability to interrupt relatively heavy fault currents or currents substantially in excess of the low excess or fault currents.

Another object of the invention is to provide positive indication that a fuse has operated on flow of a relatively low excess or fault current, i. e., about two amperes, and at the same time retain in the fuse an inherent capacity to interrupt relatively heavy fault currents by limiting the current to several hundred amperes under circuit conditions where the fault current tends to be of the order of several thousands of amperes.

A further object of the invention is to combine the arc extinguishing and operation indicating functions in a high potential fuse required to interrupt a relatively small flow of current, i.e., about two amperes.

Other objects of the invention will, in part, be obvious and, in part, appear hereinafter.

The invention, accordingly, is disclosed in the embodiment thereof shown in the accompanying drawings, and it comprises features of construction, combination of elements, and arrangement of parts which will be exemplified in the construction hereinafter set forth, and the scope of the application of which will be indicated in the appended claims.

For a more complete understanding of the nature and scope of the invention, reference may be had to the following detailed description, taken in connection with the accompanying drawings, in which:

Figure 1 is a view, in end elevation, of a potential transformer having the fuse device of the present invention mounted thereon;

Figure 2 is a view, in side elevation, of the assembly shown in Figure 1, the circuit connections for one type of application being shown diagrammatically;

Figures 3A and 3B, taken together, show a longitudinal sectional view, at an enlarged scale, of the fuse device shown in Figures 1 and 2;

Figures 4A and 4B, taken together, show, at an enlarged scale, the replaceable fuse element and indicator assembly in cross section for the fuse device shown in the preceding figures; and Figure 5 shows a modified connection to the fuse element.

Referring now particularly to Figures 1 and 2 of the drawings, it will be observed that the reference character 10 designates, generally, a potential transformer of a type that is readily available on the open market. The transformer 10 is arranged to be connected to a low voltage secondary circuit illustrated by the conductors 11 which are arranged to energize the voltage windings of various types of measuring instruments, as indicated hereinbefore.

The transformer 10 is also arranged to be connected to a high voltage primary circuit represented by the conductors 12. One of the conductors may be connected to ground, as indicated at 13, while the other may be connected through the fuse device of the present invention, shown generally at 14, to a line conductor 15. The line conductor 15 may represent one phase of a three-phase 4000-volt grounded neutral electric power distribution system. The fuse device 14 comprises, generally, an insulating housing or tube 16 having external terminals 17 and 18 at its ends that are mounted in suitable fuse clips 19 and 20, carried by insulators 21 and 22, respectively, that, for convenience, may be mounted on the transformer 10, as shown.

In Figures 3A and 3B of the drawings, the details of construction of the fuse device 14 are more clearly shown. It will be observed that the terminals 17 and 18 are provided with outwardly extending flanged portions 25 and 26 for interfitting between the terminal clips 19 and 20, Figure 2, in order to prevent removal of the fuse device 14 from them except by pulling it outwardly therefrom. Flat-headed screws 27 and 28, positioned as shown, in suitable countersunk apertures serve to hold the external terminals 17 and 18 in position. The housing or tube 16, to which the terminals 17 and 18 are attached, is formed of insulating material, such as a phenolic condensation product, for relatively low distribution voltages such as 2300 to 4000 volts. For relatively higher voltages, the housing or tube 16 should be formed of glass or glass lined with plaster of Paris or fiber covered by glass or porcelain. The terminal 18 is provided with an extension 30 having a centrally located aperture 31, the purpose of which will be presently set forth. Within the housing or tube 16 there is provided a mass 32 of powdered insulating material such as limestone or marble dust. A linen washer 33 at the lefthand end of the housing or tube 16 and a linen ring 34 at the righthand end serve to retain the mass 32 of powdered material in place. The terminal 17 is provided with vent openings 35 and the terminal 18 is likewise provided with vent openings 36 in order to allow release of the accumulation of pressure within the housing or tube 16 during short circuit operation of the device.

The external terminals 17 and 18 are interconnected by means of a conductor that is embedded in the mass 32 of limestone or marble dust. This conductor is in the form of a replaceable element or refill unit, shown generally at 39, and illustrated in more detail in Figures 4A and 4B of the drawings, to which reference will now be had. As there shown, a generally U-shaped terminal 40 is provided and is adapted to be positioned at the left-hand end of the housing or tube 16, Figure 3A, and it is provided with suitable threaded openings 41 for receiving the screws 27 which extend through both the terminal 17 and the housing or tube 16 and in addition the screws 42 which extend only through the housing or tube 16. A terminal 43 is suitably secured to the U-shaped terminal 40 and a tubular end portion thereof is deformed onto one end of a conductor 44, shown in the form of a collapsed coil of wire, the other end of which is secured by having one end of an intermediate terminal 45 deformed thereon. The conductor 44 is adapted, under certain conditions, to automatically increase its resistance so that it becomes in effect a non-conductor. The conductor 44 is formed of either tungsten or molybdenum, which are refractory metals, and which possess the ability to react with a reagent evolved from the mass 32 of marble dust in which it is embedded to change itself into a non-conducting oxide whereby arcless circuit interruption is effected due merely to change in resistance without requiring the physical separation of terminals or their equivalent for elongating an arc. The intermediate terminal 45 is held in position within the housing or tube 16 by means of an S-shaped spring spider 46 that is slidable within the bore of the housing or tube 16 and bears against the inner surface thereof. For practical reasons the distance between the terminal 43 and the intermediate terminal 45 is limited. Moreover, it is desirable to have a much longer length conductor 44 between the terminals than is permitted merely by extending it directly therebetween. By forming the conductor 44 into the coil, as shown, it is possible to provide the desired length thereof and at the same time have the required minimum spacing between the terminals 43 and 45.

A generally cylindrical terminal 48 is provided for positioning within the righthand end of the housing or tube 16, Figure 3B. It is provided with suitable threaded apertures 49 for receiving the screws 28 which extend through both the terminal 18 and the housing or tube 16, as well as the screws 50 which extend only through the housing or tube 16. The terminal 48 is provided with a reduced portion 51 within the apertured end of which there is positioned a tube 52, formed of insulating material such as a phenolic condensation product or glass or porcelain. If desired, the tube 52 may be secured in position in the reduced portion 51 by cement 53 although this is not necessary. At the outer end of the tube 52 there is provided a fitting 54 formed of insulating material such as a phenolic condensa-product. One end of the fitting 54 is threaded, as shown, onto one end of the intermediate terminal 45 while the other end is reduced and fits snugly within the outer end of the tube 52.

It is desirable to provide a predetermined tension on the fusible element which is intended for low excess current operation so that under such operating conditions the arc will be rapidly lengthened and extinguished.

At the same time it is also desirable to provide an indication that the device has operated in order to facilitate the detection of the device which should be replaced. For these purposes the terminal 48 is provided with a cylindrical bore 57 in which an indicator member 58 is slidably mounted. The indicator member 58 is tubular in form and there is provided inside of it a coil compression spring 59 which reacts at one end against a shoulder 60 of the terminal 48 and at the other end against an inclined shoulder 61 of the indicator member 58. It will be observed that the spring 59 is shown in the compressed position and that it normally tends to urge the indicator member 58 outwardly with respect to the terminal 48. As shown in Figure 3B of the drawings, the indicator member 58 is positioned within the aperture 31 in the extension 30 of the terminal 18 and normally is withdrawn slightly from the outer end. When released, the indicator member 58 projects a considerable distance out of the aperture 31, as shown in Figure 2, and, by its presence in this position, indicates that the fuse has blown and should be replaced.

Within the tubular indicating member 58 there is provided a terminal rod 62 that projects through an aperture 63 in the indicator member 58 and is held therein by a cross pin 64. When initially assembled, the terminal rod 62 extends some distance through the aperture 63, as indicated at 65. Such a construction is employed in order to facilitate assembly. After the pin 64 has been placed in position, the projecting portion 65 is cut off, as will be readily understood.

At its inner end the terminal rod 62 is provided with a tubular portion 67 that is deformed onto one end of a relatively high strength wire 68 forming a part of a fusible element that is arranged to be responsive to flow of relatively low excess current. Preferably, the wire 68 is formed of corrosion resisting material such as a nickel-chromium alloy. As an example, the wire 68 may be of a material sold on the open market under the name of Chromel (A) having a diameter of 0.0113″. The other end of the wire 68 is looped over a pin 69 that extends through the fitting 54 and, as indicated at 70, several turns thereof are positioned around itself after which a coil 71 of the wire is formed about a spacer 72. The end portion of the wire 68, as indicated at 73, passes through a suitable groove 74 in the fitting 54 and then is secured within the tubular portion of the intermediate terminal 45 with the end of the conductor 44, as previously described. The spacer 72 is preferably formed of heat resisting material such as lava. Within the tube 52 there is a filling comprising a mass 75 of powdered material, such as limestone or marble dust which embeds the wire 68, including the coil 71. A plug 76, formed of suitable heat resisting material, such as asbestos, is provided, as shown, to hold the mass 75 of powdered material in place.

It will be observed that a space 77 is provided within the terminal 48. Apertures 78 serve to connect this space with the inside of the housing or tube 16, Figures 3A and 3B, the linen washer 34 merely serving to prevent the powder 32 from escaping. The apertures 78 provide for venting the interior of the housing or tube 32 into the space 77 which in effect forms an expansion chamber.

The electrical connection from the terminal rod 62 to the terminal 48 is provided by the spring 59 and by whatever contact there may be between the tubular indicating member 58 and the terminal 48 within the bore 57 and with the terminal 18 within the bore 31 of the extension 30, Figure 3B. For an application where an appreciable current would flow under normal operating conditions, of course, such a connection would be undesirable. However, when it is recalled that the normal current flow is of the order of milliamperes, it will be readily understood that ample current carrying capacity is provided. If desired, however, a flexible shunt can be connected between the indicator member 58 and the terminal 48 to provide the desired contact.

In operation, assuming that the secondary circuit comprising the conductors 11, Figure 2, become short-circuited, then the current flow in the primary circuit represented by the conductors 12 is of the order of two to three amperes. This amount of current is not sufficient, by itself, to melt the fusible element 68 or cause it to blow, but the heat generated by the current flowing through the coil 71 in addition to the heat generated by the current flow through the fusible element 68 itself is sufficient to melt the portion thereof within the coil 71 and the ends are immediately parted since the spring 59 is no longer restrained. Not only does the spring 59 withdraw the fusible element 68 so that any low current arc formed is quickly extinguished because the ends are extended beyond a point where the recovery voltage is incapable of restriking the arc, but also the indicator member 58 is moved outwardly to indicating position. The withdrawal of the fusible element 68 by the spring 59 provides additional break distance beyond that merely required to interrupt the arc. The purpose of this is to add a margin of safety to withstand the prolonged application of voltage following fuse operation.

Under the foregoing assumed conditions, substantially no change takes place in the resistance characteristics of the refractory metal conductor 44. However, in the event that flow of current through the fuse device 14 takes place in excess of that which is required to effect the blowing of the fusible element 58, as is the case when the primary circuit represented by the conductors 12 is short circuited, the flow of current is relatively great. In such case, the entire length of the fusible element 68 will be promptly melted and, due to the heat generated by the relatively high current flowing through the conductor 44, it causes a reagent to be evolved from the mass 32 of limestone or marble dust which reacts with the conductor 44 to change its characteristics from those of a conductor to those of a resistor, the resistance of which is substantially infinite. In effect, it becomes an insulator. This change takes place rapidly, for example in a fractional part of a half-cycle of alternating current so that, while there might be a tendency for the short circuit to reach a value of several thousands of amperes if it were permitted to go through the complete half cycle, actually the resistance of the conductors 44 automatically changes so rapidly that the current flow is limited to merely a few hundred amperes.

After the fuse device 14 has operated, the indicator member 58 will have moved to the position shown by the broken lines in Figure 2 of the drawings. It is then removed from the terminal clips 19 and 20 and replaced with a new fuse device, after which the blown fuse may be re-fused or reconditioned for future operation.

In order to re-fuse the device 14, the screws 27 and 28 are removed, thereby permitting removal of the external terminals 17 and 18. When the linen washer 33 is removed, the mass 32 of powder can be shaken out of the housing or tube 16. The screws 42 and 50 are then removed and the parts of the blown refill unit are removed and discarded. A new refill unit, as indicated at 39 in Figures 4A and 4B, is then inserted in the housing or tube 16 and the terminals 40 and 48 are aligned in proper positions to receive the screws 42 and 50. The housing or tube 16 is then filled with a new charge of the before mentioned powder and the linen washer 33 is placed in position, the terminal 17 is replaced. The terminal 18 is likewise replaced, after which the re-fused device 14 is suitable for another operation.

In Figure 5 of the drawings there is shown a modified construction in which a rod-like connecting member 81, either solid or tubular as shown and formed of copper or like material, is provided for interconnecting the tubular portion 67 of the terminal rod 62 and the wire 68. The end 82 of the connecting member 81 can be deformed or welded onto the wire 68 while the tubular portion 67 is deformed or welded onto the other end 83. Obviously the terminal rod 62 and the connecting member 81 could be integrally formed, if desired.

Since the connecting member 81 has a much greater current carrying capacity than does the wire 68, it will not be as readily fused under extreme short circuit conditions and consequently arcing within the tube 52 will be confined to the vicinity of the spacer 72 with substantially less metal being vaporized and less energy released than is the case when the wire 68, extending through the mass 75 of powdered material as shown in Figures 4A and 4B, is completely vaporized.

Since certain further changes may be made in the foregoing construction and different embodiments of the invention may be made without departing from the scope thereof, it is intended that all matter contained in the above description or shown in the accompanying drawings shall be interpreted as illustrative and not in a limiting sense.

What is claimed as new is:

1. In a circuit interrupter for high voltage electric power circuits adapted to interrupt the flow of relatively low excess current as well as current flow above such low excess current and provided with an insulating housing having terminals, conductor means within said housing interconnecting said terminals and including a section the resistance of which automatically increases to a relatively high value on flow therethrough of current greater than said low excess current and a relatively high strength fusible section, spring means tensioning said fusible section, and means for substantially increasing the temperature to which a portion of said fusible section is subjected to cause said portion to blow on flow of low excess current over the temperature resulting only from the flow of such current through said portion, the ends of said fusible section adjacent the portion thereof that is blown on flow of said low excess current forming terminals between which an arc is drawn and extinguished whereby the flow of said low excess current is interrupted.

2. In a circuit interrupter for high voltage electric power circuits adapted to interrupt the flow of relatively low excess current as well as current flow above such low excess current, in combination, a tubular insulating housing, terminals at the ends of said housing, conductor means within said housing interconnecting said terminals including a section the resistance of which automatically increases to a relatively high value on flow therethrough of current greater than said low excess current and a relatively high strength fusible section and a coil of metal surrounding said fusible section and connected in series circuit relation therewith for causing a selected portion of said fusible section to melt on flow of said low excess current insufficient of itself to melt the same, an indicator movable through one of said terminals from non-indicating to indicating position and restrained by said fusible section, and spring means biasing said indicator and tensioning said fusible section.

3. In a circuit interrupter for high voltage electric power circuits adapted to interrupt the flow of relatively low excess current as well as current flow above such low excess current, in combination, a tubular insulating housing, terminals at the ends of said housing, conductor means within said housing interconnecting said terminals including a section the resistance of which automatically increases to a relatively high value on flow therethrough of current greater than said low excess current and a relatively high strength fusible section and a coil of metal surrounding said fusible section and connected in series circuit relation therewith for causing a selected portion of said fusible section to melt on flow of said low excess current insufficient of itself to melt the same, an indicator movable through one of said terminals from non-indicating to indicating position and restrained by said fusible section, spring means biasing said indicator and tensioning said fusible section, and a filling of powdered material within said housing embedding said conductor and adapted when heated to release a chemical reagent for attacking said section the resistance of which automatically increases to reduce it to substantially a non-conductor.

4. A refill unit for positioning within a fuse tube and interconnecting the external terminals at its ends comprising, in combination, a generally cylindrical terminal for positioning within said fuse tube at one end and connection to the external terminal thereat, a tubular indicator member movable through said terminal, a spring within said tubular member reacting between it and said terminal and biasing it outwardly, an insulating tube carried by said terminal, a conductor within said insulating tube anchored adjacent its outer end and attached to said indicator member and restraining the same, a coil of wire surrounding said conductor and connected in series circuit relation therewith for causing a selected portion of said fusible section to melt on flow of current insufficient of itself to melt the same, a filling of finely divided insulating material within said insulating tube embedding said conductor and wire, an intermediate terminal at said outer end of said insulating tube connected to said coil of wire, a generally U-shaped terminal for positioning within said fuse tube at the other end and connection to the external terminal thereat, and a conductor interconnecting said intermediate terminal and said U-shaped terminal and comprising a coil of refractory metal.

5. In a circuit interrupter for high voltage electric power circuits adapted to interrupt the flow of relatively low excess current and provided with an insulating housing having terminals, conductor means within said housing interconnecting said terminals and including a relatively high strength fusible section and a rod-like section, spring means tensioning said fusible section through said rod-like section, means for substantially increasing the temperature to which said fusible section is subjected on flow of low excess current to effect blowing of the same and formation of an arc only at one end of said rod-like section, and indicating means adapted to be released for movement to indicating position on blowing of said fusible section.

6. In a circuit interrupter for high voltage electric power circuits adapted to interrupt the flow of relatively low excess current as well as current flow above such low excess current and provided with an insulating housing having terminals, conductor means within said housing interconnecting said terminals and including a section the resistance of which automatically increases to a relatively high value on flow therethrough of current greater than said low excess current and a relatively high strength fusible section and a rod-like section, spring means tensioning said fusible section through said rod-like section, means for substantially increasing the temperature to which said fusible section is subjected on flow of low excess current to effect blowing of the same and formation of an arc only at one end of said rod-like section, and indicating means adapted to be released for movement to indicating position on blowing of said fusible section.

7. In a circuit interrupter for high voltage electric power circuits adapted to interrupt the flow of relatively low excess current, in combination, a tubular insulating housing, terminals at the ends of said housing, conductor means within said housing interconnecting said terminals including a relatively high strength fusible section and a coil of metal surrounding said fusible section and connected in series circuit relation therewith for causing a selected portion thereof to melt on flow of low excess current insufficient of itself to melt the same, said coil of metal being located intermediate said terminals and at a substantial distance from both of them, and means tensioning said fusible section and acting to withdraw the end of the same adjacent the portion that is melted for extending the arc incident thereto toward one of said terminals and extinguishing the same, said tubular insulating housing being of sufficient length to permit extinction of the arc a substantial distance away from said one terminal and well within said housing solely by extending the arc for interrupting the flow of said low excess current.

8. In a circuit interrupter for high voltage electric power circuits adapted to interrupt the flow of relatively low excess current as well as current flow above such low excess current and provided with an insulating housing having terminals, conductor means within said housing interconnecting said terminals and including a section the resistance of which automatically increases to a relatively high value on flow therethrough of current greater than said low excess current and a relatively high strength fusible section and a coil of metal surrounding said fusible section and connected in series circuit relation therewith for causing a selected portion thereof to melt on flow of said low excess current insufficient of itself to melt the same, said coil of metal being located intermediate said terminals and at a substantial distance from both of them, and means tensioning said fusible section and acting to withdraw the end of the same adjacent the portion that is melted for extending the arc incident thereto toward one of said terminals and extinguishing the same, said tubular insulating housing being of sufficient length to permit extinction of the arc a substantial distance away from said one terminal and well within said housing solely by extending the arc for interrupting the flow of said low excess current.

SIGURD I. LINDELL.